(12) United States Patent
Kabakov

(10) Patent No.: US 6,352,458 B2
(45) Date of Patent: Mar. 5, 2002

(54) PROPULSION SYSTEM AND METHOD

(76) Inventor: Vladimir M. Kabakov, 4600 S. Four Mile Run Dr., Apt. 1201, Arlington, VA (US) 22204

( * ) Notice: Subject to any disclaimer, the term of this patent is extended or adjusted under 35 U.S.C. 154(b) by 0 days.

(21) Appl. No.: 09/741,102

(22) Filed: Dec. 21, 2000

Related U.S. Application Data (63) Continuation-in-part of application No. 09/620,532, filed on Jul. 20, 2000, now Pat. No. 6,224,441, which is a continuation-in-part of application No. 09/479,891, filed on Jan. 10, 2000, now abandoned.

(51) Int. Cl.$^7$ ................................................. B63H 1/08
(52) U.S. Cl. ............................... 440/93; 244/9; 244/19; 244/70; 416/110
(58) Field of Search ............................ 440/90, 92, 93; 244/9, 19, 20, 70; 416/110; 114/272

(56) References Cited

U.S. PATENT DOCUMENTS

| | | | | |
|---|---|---|---|---|
| 1,450,454 A | * | 4/1923 | Roney | 244/70 |
| 1,667,140 A | * | 4/1928 | Clark | 416/110 |
| 3,738,598 A | * | 6/1973 | Larkin | 114/272 |
| 5,326,324 A | * | 7/1994 | Hamada | 464/180 |
| 6,224,441 B1 | * | 5/2001 | Kabakov | 440/93 |
| 6,227,483 B1 | * | 5/2001 | Therriault | 244/20 |

FOREIGN PATENT DOCUMENTS

GB          217223      * 9/1924 ................ 440/93

* cited by examiner

Primary Examiner—Sherman Basinger (57) ABSTRACT

A method and system for propelling or sustaining marine vessels and aircraft. A propulsive force is developed in a gaseous or liquid fluid as a result of rotation of two pairs of generally parallel blades around two perpendicular intercrossed axes with the same speed. The blades are mounted with variable angles of incidence in the planes of rotation around one of the axis and are rotated together with this axis around the second axis. As a result, the blades work simultaneously both in a paddling manner and as a screw propeller with both sides of the blades being used consecutively as working surfaces. In preferred embodiments of the propulsion apparatus, the blades are mounted on a rotated gearbox which is mounted on a hollow driving shaft. The gearbox includes planetary bevel gear engagement with sun gears mounted on a support coaxially to the hollow driving shaft. The propulsion system can include two or more propulsion apparatus with parallel driving shafts rotated in opposite directions for developing a unidirectional propulsive force.

25 Claims, 8 Drawing Sheets

PROPULSION SYSTEM AND METHOD

CROSS-REFERENCE TO RELATED APPLICATIONS

The present application is a continuation-in-part of application Ser. No. 09/620,532 filed on Jul. 20, 2000, now a U.S. Pat. No. 6,224,441 which is continuation-in-part of application Ser. No. 09/479,891 filed on Jan. 10, 2000 which is now abandoned.

BACKGROUND OF THE INVENTION

1. Field of the Invention

This invention relates generally to improvements in propeller systems, and more particularly, it pertains to a new method and system for developing a propulsive force in a gaseous or liquid fluid that can be used for propulsion or sustaining aircraft, marine vessels, and land vehicles, such for example, as snowmobiles, etc. Numerous other applications can be derived from the use of this invention, for example in designing apparatus for moving gaseous or liquid fluids such as fans, pumps. etc.

2. Description of the Prior Art

Historically, various propeller and paddling systems have been developed for propulsion of different types of vehicles by movement of water or air in opposite direction to the movement of the vehicle. Although, at the present time, screw type propellers are the most common form of marine and aircraft propulsion, they have a number of disadvantages. Because the propeller blades are oriented at certain angles to the direction of the rotation, a lot of energy is being lost to friction with air or water, wake forming, vortices, cavitation, etc. The screw propellers are also relatively noisy, which may be undesirable in many situations, such as for submarines, for fishing or pleasure boats, etc.

Many improvements of the screw propellers have been suggested throughout the years. Numerous patents and researches have been devoted to development of propeller systems wherein the propeller blades are pivoted simultaneously with rotation of the driving shaft and to the problem of optimizing such cyclic variations of the orientation of individual blades. Some of such systems utilize rotation of propeller blades or paddles not only around the axis of the driving shaft but also around complementary axes of rotation for more effective exertion of propulsive force. The basic concept presented in these systems is that the usable propulsive force is developed as a result of rotating the blades around two axes of rotation with variable orientation of the rotated blades relative to the driving shaft.

Propulsion apparatus are known (U.S. Pat. No. 1,284,282 to Fitzpatrick, U.S. Pat. No. 1,450,454 to Roney, U.S. Pat. No. 1,667,140 to Clark, U.S. Pat. No. 1,923,249 to Abram) wherein blades of feathering type extend radially from the driving shaft and are rotated around radial axes simultaneously with rotation of the driving shaft. In the paddling position, the blades are held in a plane parallel to the axis of the driving shaft and in the feathering position, the blades are held in a plane perpendicular to the axis of the driving shaft. A serious drawback of such systems is that, in the process of changing from one position to the other, the blades have to be rotated 90 degrees around their longitudinal axes with a considerable resistance of the fluid and low paddling and propulsion efficiency during such rotation. That is why such systems have low propulsion efficiency in comparison with screw type propellers.

There are also known propulsion apparatus wherein the propeller blades are oriented and rotated in the planes parallel to the driving shaft (U.S. Pat. No. 3,270,820 to Frazier, British patent No. 217,223 to Pensovecchio). Although having advantages in respect to the propellers with feathering blades, such apparatus with only two blades mounted in a plane perpendicular to the propeller shaft also have low efficiency and irregular power consumption. Different combinations of such propulsion apparatus are cumbersome and the mechanisms employed to effect their operations are far too complicated to render them practical. For these reasons, a limited success has been obtained by such type of apparatus.

The invention seeks to overcome the deficiencies of known propulsion systems and to benefit from the advantages that may be expected from the new method and system.

The object of the invention is to provide a reliable propulsion system for marine vessels, aircraft and land vehicles with improved propulsion and energy efficiency.

BRIEF SUMMARY OF THE INVENTION

The invention is based on my discovery that an effective propulsive force in a liquid or gaseous fluid can be developed by rotating a driving shaft with four blades which are simultaneously rotated around two intercrossed axes which are perpendicular to each other in a plane perpendicular to the axis of the driving shaft. Each blade is oriented so that it is always held in a plane generally perpendicular to the axis around which it is rotated. The blades and the driving shafts are interconnected so when two parallel blades, which are rotated around one of the intercrossed axis, are oriented in the same direction parallel to the axis which is perpendicular to the driving shaft, the other two parallel blades, which are rotated around the other of the intercrossed axis, are oriented in opposite directions parallel to the axis of the driving shaft. Each two adjacent blades mounted in perpendicular planes are rotated in different directions (clockwise and counterclockwise). It was discovered that it is possible to rotate four such blades around perpendicular intercrossed axes without interfering with each other simultaneously around the driving shaft and the perpendicular intercrossed axes with the same speed. During such double rotations, the radial extensions of the blades relative to the driving shaft are changing as a function of the angle of rotation. As a result, both sides of the blades are being used consecutively as paddling surfaces and the speed of paddling motion of the blades is changing during each stroke, resembling a fishtail or frog-leg action of the aquatic nature. Preferably, the blades have airfoil sections.

In preferred embodiments of the invention, the blades are constrained by the planetary gear engagements to rotate with the same speed around the axis of the driving shaft and around the intercrossed axes of the radial shafts mounted in rotated gear-boxes. Each gear-box comprises four radial shafts on which planet angle mitre gears and blades are mounted. The sun gears of the planetary engagements are mounted coaxially to the driving shafts.

In addition, simultaneously with the paddling process, the rotated blades can work as a double screw propeller if they are mounted with angles of incidence in the planes of rotation around the radial axes. Because the orientations of the blades are constantly changed during the rotation of the driving shaft, the angles of incidence of them must be variable. For this purpose, the blades may be mounted on the radial shafts with ability to swing around the axes perpendicular to these shafts. They can be swung by circular cams mounted coaxially with the radial shafts.

For developing a unidirectional propulsive force, the propulsion system may include two or more parallel driving shafts rotated in opposite directions. It is possible to mount the driving shafts in vertical or horizontal positions in a close proximity to each other and/or to a driven vehicle by the sides where the rotated blades are parallel to the driving shaft.

BRIEF DESCRIPTION OF THE DRAWINGS

The objects and features of the present invention will become apparent from the following description taken in conjunction with the preferred embodiments thereof with reference to the accompanying drawings, in which.

DETAILED DESCRIPTION OF THE INVENTION

Figure 7:
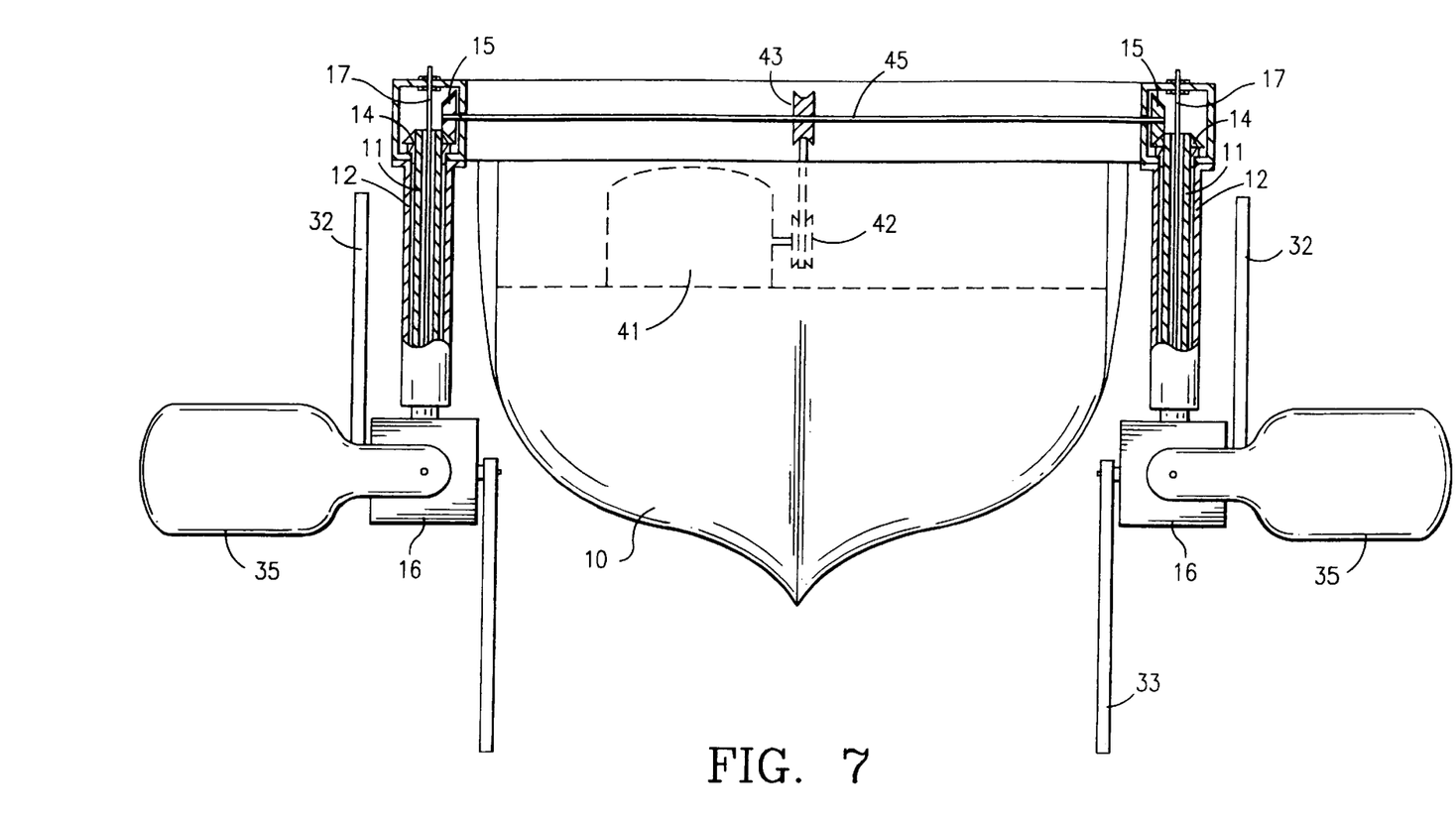
FIG. 7 is a schematic fragmentary cross-sectional view from the stern of a boat with another embodiment of propulsion system with the driving shafts mounted on both sides of the boat.
Figure 10:
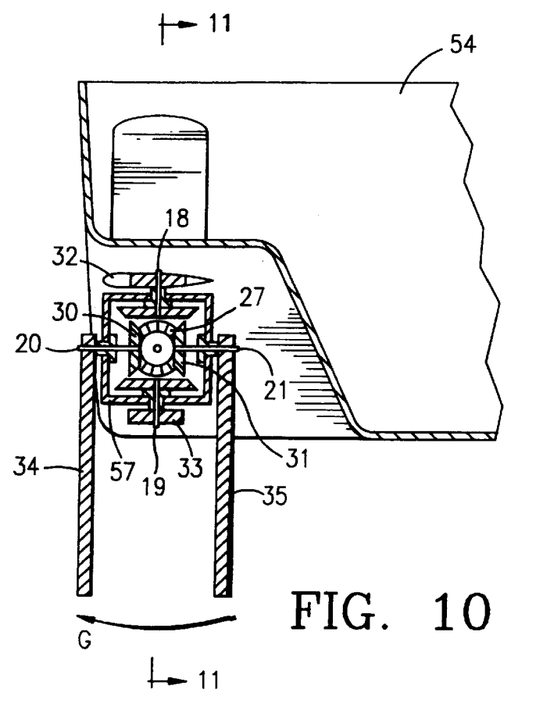
FIG. 10 is a schematic view from the stern of a boat with another embodiment of the propulsion system having a fragmentary cross-section on the lines 10—10 of FIG. 11.
Figure 11:
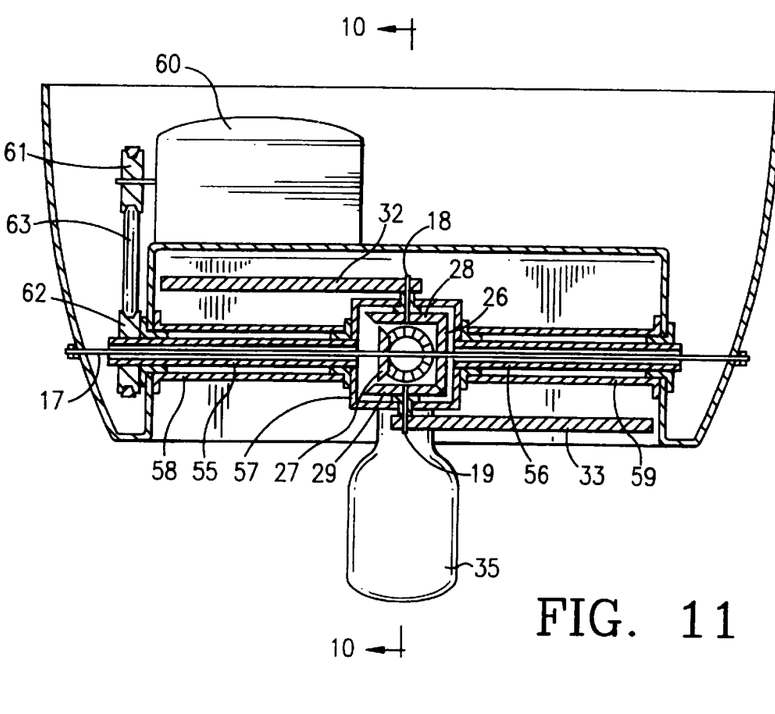
FIG. 11 is a cross-sectional view on the lines 11—11 in FIG. 10.

The invented propulsion system can be used in outboard motor applications for marine vessels (FIGS. 1, 2, 3) or in stern drive applications where the engine is enclosed within the hull of the vessel (FIGS. 7, 10, 11). Identical details have the same indications in different embodiments.

Figure 1:
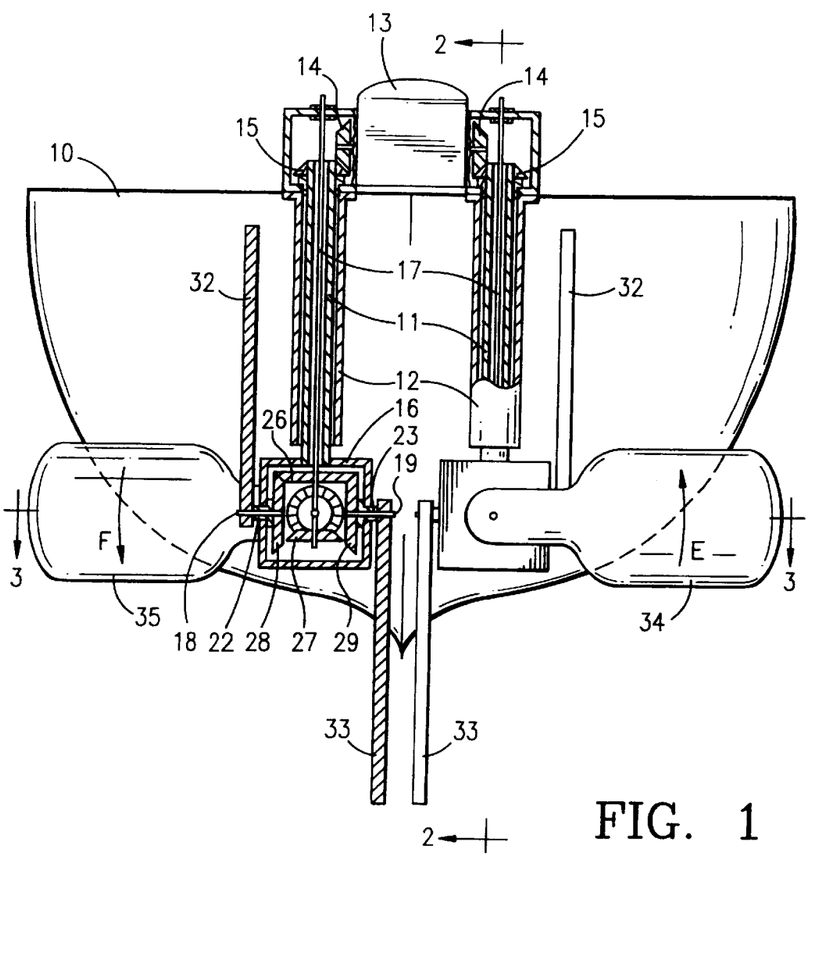
FIG. 1 is a schematic view from the stern of a boat with a preferred embodiment of the propulsion system and a fragmentary cross-section on the lines 1—1 of FIG. 2.
Figure 2:
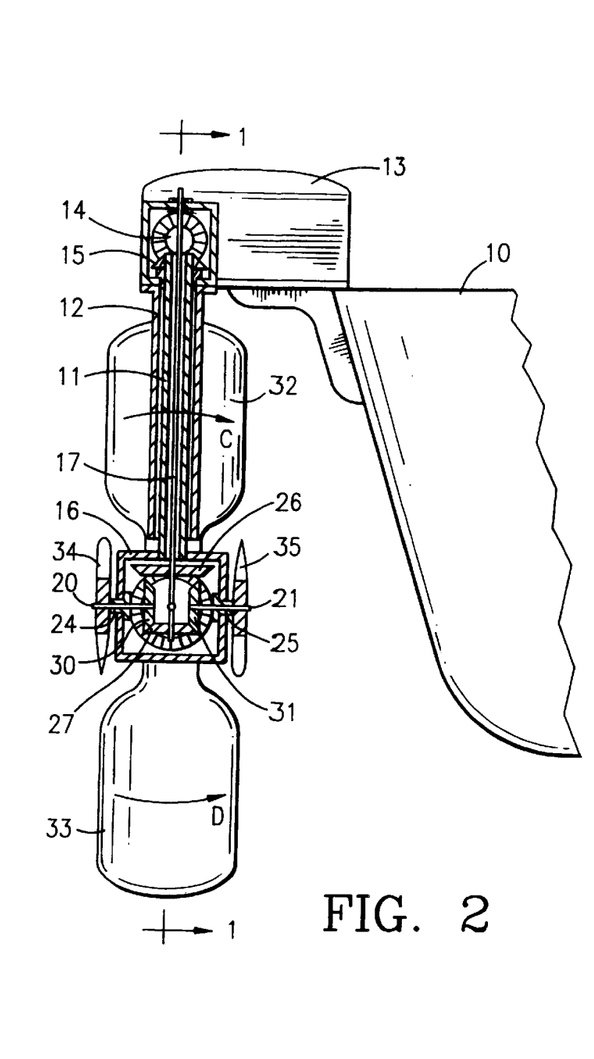
FIG. 2 is a cross-sectional view on the lines 2—2 of FIG. 1.
Figure 3:
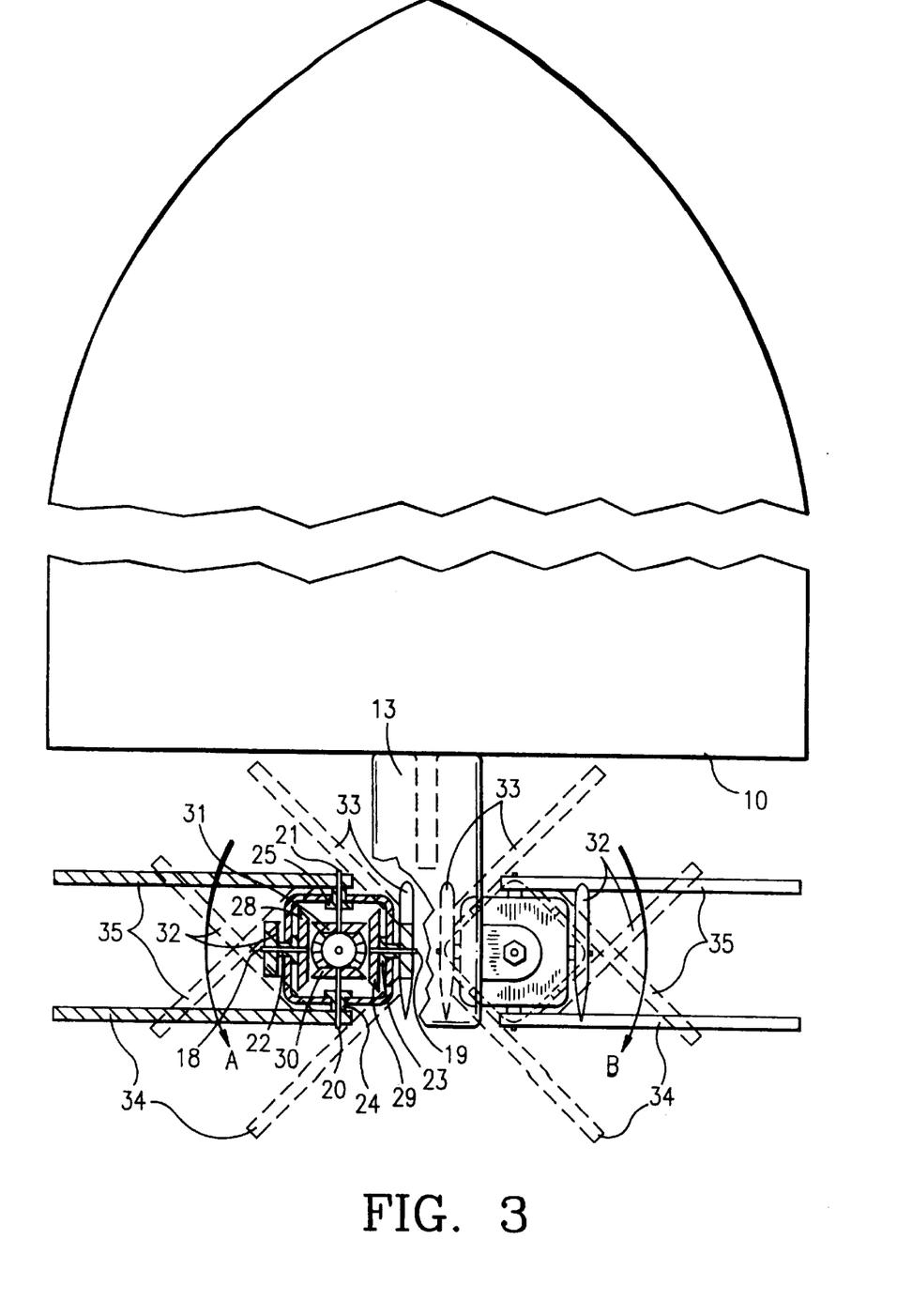
FIG. 3 is a schematic fragmentary cross-sectional top plan view on a boat with a preferred embodiment of the propulsion system on the lines 3—3 of FIG. 1.

The propulsion system illustrated in FIGS. 1, 2, 3 includes two vertical hollow driving shafts 11 which are rotatably mounted in housings 12 and can be rotated in opposite directions by an internal combustion engine 13 through gear engagements 14, 15 (or any other type of drive). Planetary gear-boxes 16 are mounted on the hollow driving shafts 11. An axial support means 17 is fixed coaxially to the hollow driving shaft 11. Each gear-box 16 comprises four radial shafts 18, 19, 20 and 21 which are perpendicular to each other in a plane perpendicular to the axis of the driving shaft 11. Each of the radial shafts can be rotated in two bearings, one of which (22, 23, 24 or 25) is mounted in the wall of the gear-box and another in the central part of the gear-box (not shown). Two sun bevel mitre gears 26 and 27 are mounted on the axial support means 17. Two planet bevel mitre gears 28 and 29 are mounted on the radial shafts 18 and 19, respectively, so that they are engaged with the sun bevel mitre gear 26. Another two planet bevel mitre gears 30 and 31 are mounted on the radial shafts 20 and 21, respectively, and are engaged with the sun bevel mitre gear 27. The planetary gear-boxes 16 can be filled with a lubricating oil.

Blades 32, 33, 34 and 35 are mounted on the ends of radial shafts 18, 19, 20 and 21, respectively, so that each of these blades is generally lying in a plane perpendicular to the axis of the radial shaft on which it is mounted. The blades are oriented in such a way that when two of them (34 and 35) extend in the same direction perpendicular to the driving shaft 11, the other two blades (32 and 33) extend in opposite directions parallel to the driving shaft 11. Preferably, the blades 32, 33, 34, 35 have airfoil sections.

In operation, the planetary gear boxes 16 are rotated together with the blades 32, 33, 34, 35 in the directions indicated by arrows A and B (FIG. 3). Simultaneously, the blades 32, 33, 34, 35 are constrained by the planetary engagements of angle mitre gears 26, 28, 29 and 27, 30, 31 to rotate around the intercrossed axes of the radial shafts 18, 19, 20, 21 with the speed of rotation of the hollow driving shafts 11. The blades adjacent to each other in the perpendicular planes are rotated in opposite directions (clockwise and counterclockwise) not interfering with each other. As a result of such double rotation, the blades operate in a paddling fashion with their radial extensions relative to the axis of the hollow driving shaft being changed as a function of the angle of rotation. The blades 34 and 35 which are shown in a horizontal paddling position perpendicular to the longitudinal axis of the boat 10 have the maximum extensions and, as a result, the biggest swept surface, while the other two propeller blades 32, 33 are in vertical positions parallel to the driving shafts 11 in the planes parallel to the longitudinal axis of the boat. After the next 90 degree rotation of the driving shafts 11, the blades 32, 33 come to the horizontal positions perpendicular to the longitudinal axis of the boat and the other two blades 34, 35 come to the vertical positions (not shown). The positions of the blades after 45 degree rotation of the driving shaft is shown in dashed lines. Each pair of blades, rotated around the same radial axis in opposite directions, are parallel to each other in horizontal positions. The circumferential velocity of the blades relative to the driving shafts 11 gradually increases when the orientations of the blades are changed from vertical to horizontal positions. As a result, an additional acceleration and propulsion force is produced during each of the paddling stroke of the blades.

Figures 4, 5, 6:
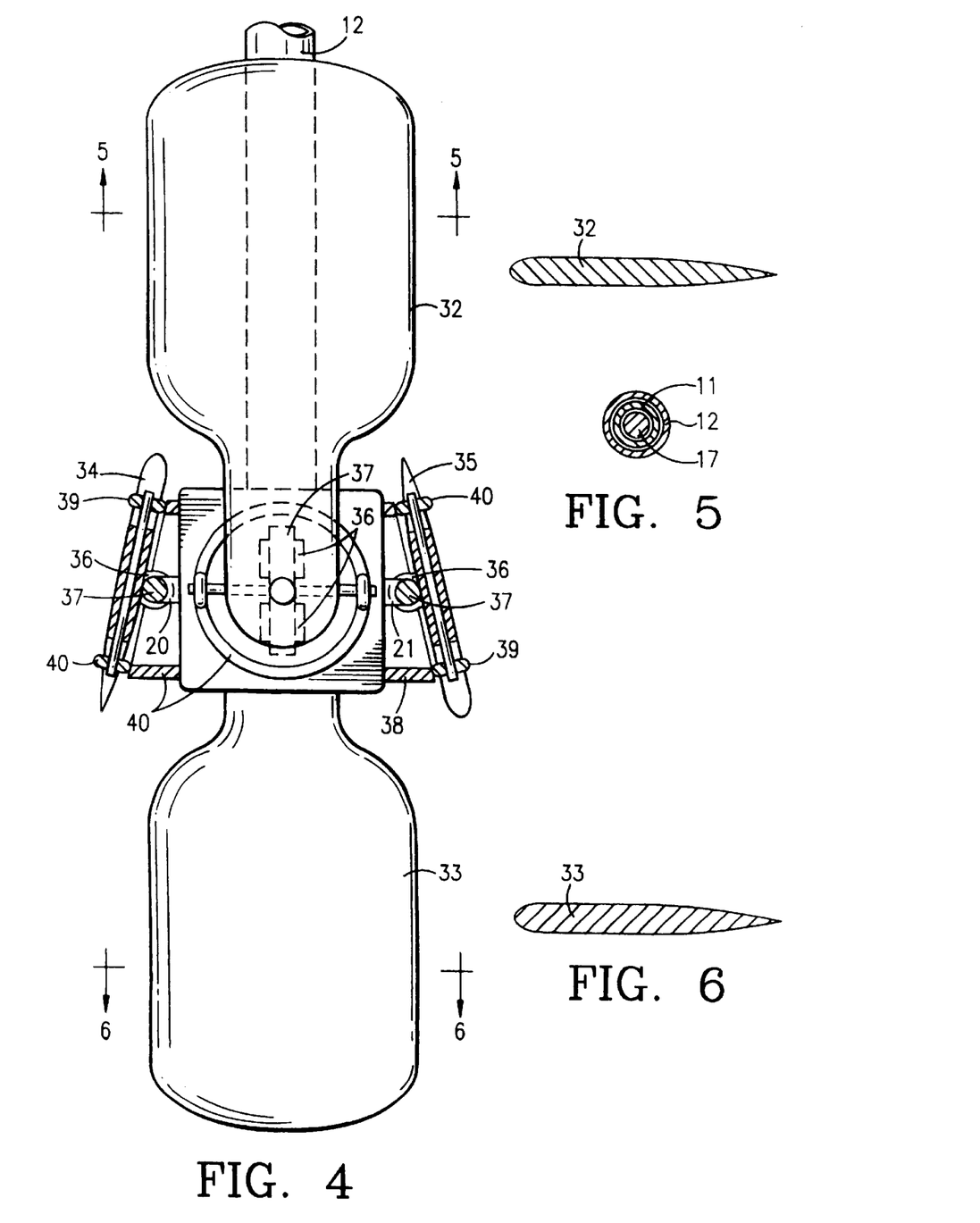
FIG. 4 schematically illustrates another embodiment of the propulsion apparatus with the blades mounted on the radial shafts with variable angles of incidence.
FIG. 5 is a cross-sectional view on the lines 5—5 of FIG. 4.
FIG. 6 is a cross-sectional view on the lines 6—6 of FIG. 4.

The blades 32, 33, 34, 35, which are rotated around horizontal axes by radial shafts 18, 19, 20, 21, respectively, in opposite directions indicated by the arrows C, D, E, F, can be used as the blades of a double screw propeller. For this purpose, the blades may be mounted with angles of incidence in the planes of rotation around the horizontal axes. Because the orientations of the blades relative to the longitudinal axis of the boat 10 are changing during the rotation of the driving shafts with both surfaces of the blades used consecutively for paddling, the angles of incidence of the blades must be variable. For this purpose, each of the blades is mounted on the radial shaft with ability to swing in the bearings 36 around the axis 37 which is fixed to the radial shaft in perpendicular direction, as illustrated in FIGS. 4–6. Four circular cams 38 are mounted on the gear-boxes 16 coaxially to the radial shafts 18, 19, 20, 21 and the followers 39, 40 are fixed to each of the blades. The cams 38 are profiled so that during the rotation of the radial shafts, the angles of incidence of the blades are changed in accordance with the positions of the blades. In vertical positions, the angles of incidence of the blades (32, 33) are zero. When the blades (34, 35) extend perpendicular to the longitudinal axis of the boat, the angles of incidence are maximum.

In the propulsion system shown in FIG. 7, two vertical driving shafts 11 are mounted on both sides of the boat 10. They are rotated in opposite directions by an engine 41 through pulleys 42, 43, a driving belt 44, a shaft 45 and gear engagements 14, 15. The engine 41 can be mounted in the hull of the boat 10.

Figure 8:
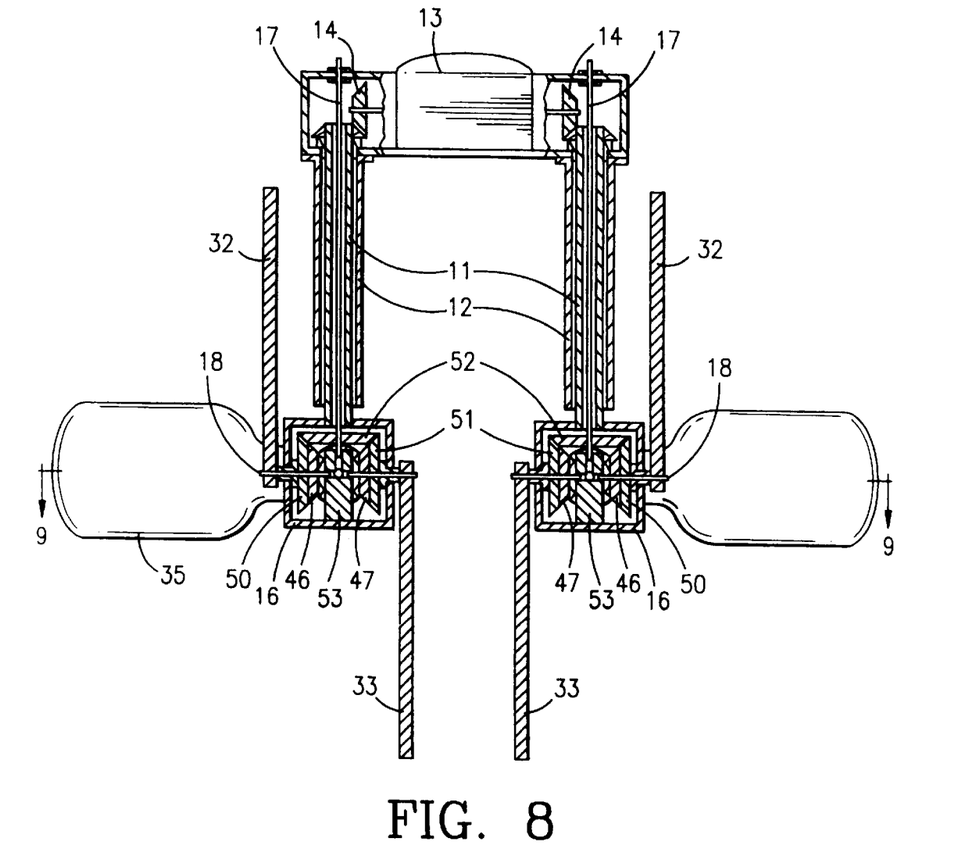
FIG. 8 is a cross-sectional view on lines 8—8 of FIG. 9 of a propulsion system for a marine vessel with an alternative design of the gear-boxes.
Figure 9:
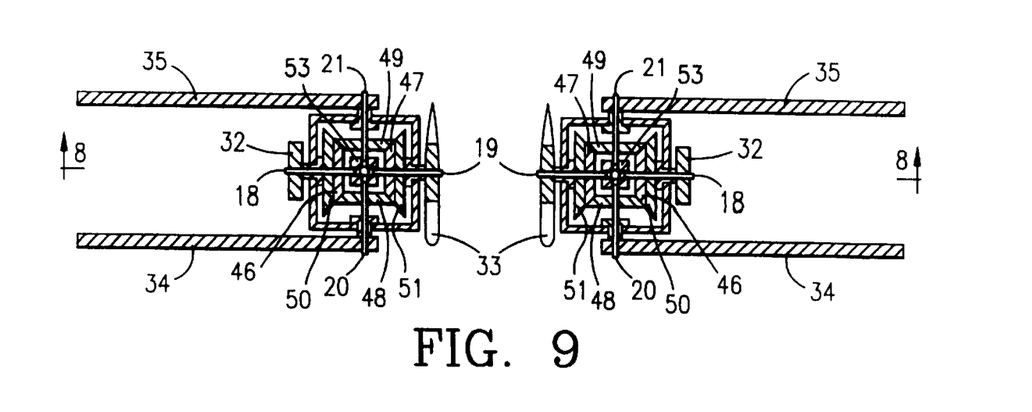
FIG. 9 is a cross-sectional view on the lines 9—9 of FIG. 8

FIGS. 8 and 9 illustrate a propulsion system with a different design of the rotated planetary gear-boxes 16. Four bevel mitre gears 46, 47, 48 and 49 which are engaged with each other, are mounted in the gear-box 16 on the radial shafts 18, 19, 20 and 21, respectively. Two planet bevel mitre gears 50, 51 are mounted on the radial shafts 18 and 19, respectively, so that they are engaged with the sun bevel mitre gear 52 which is fixed on the axial support means 17. Each of the radial shafts 18, 19, 20, 21 is rotatably mounted in two bearings. One bearing (22, 23, 24 or 25) is mounted in the wall of the gear-box 16 and another bearing is mounted in the central bearing support 53. In operation, the rotation of the gear-box 16 is transmitted to the rotation of the blades 32, 33, 34, 35 by the planetary engagements of the gears 52, 50, 51 and by four engaged gears 46, 47, 48, 49.

An alternative embodiment of the propulsion apparatus for a marine vessel 54 is illustrated in FIGS. 10, 11. A horizontal hollow driving shaft, which consists of two parts 55 and 56 with a gear-box 57 fixed between them, is mounted in the housings 58 and 59 perpendicular to the longitudinal axis of the vessel 54. The design of the planetary gear-box 57 is essentially similar to the designs of the gear-boxes 16 in the embodiments of the propulsion apparatus as shown in FIGS. 1–9. A support means 17 is fixed coaxially to the hollow driving shaft on both sides of the vessel 54. Two sun bevel mitre gears 26 and 27 are mounted on the support means 17 and are engaged with the planet bevel mitre gears 28, 29 and 30, 31, respectively.

In operation, the hollow driving shaft is rotated together with the gear-box 57 and the blades 32, 33, 34, 35 by an engine 60 through pulleys 61, 62 and a driving belt 63 (or any other type of drive) in the direction indicated by arrow G. Simultaneously, the blades are rotated with the same speed around the axes of radial shafts. As a result of such double rotation in the vertical plane, the blades work in a paddling manner with the maximum propulsion force being exerted astern when the blades are in a vertical downward position. If the blades 32, 33, 34, 35 are positioned with angles of incidence in the planes of rotation around the radial shafts, they work simultaneously as double screw propellers.

Figure 12:
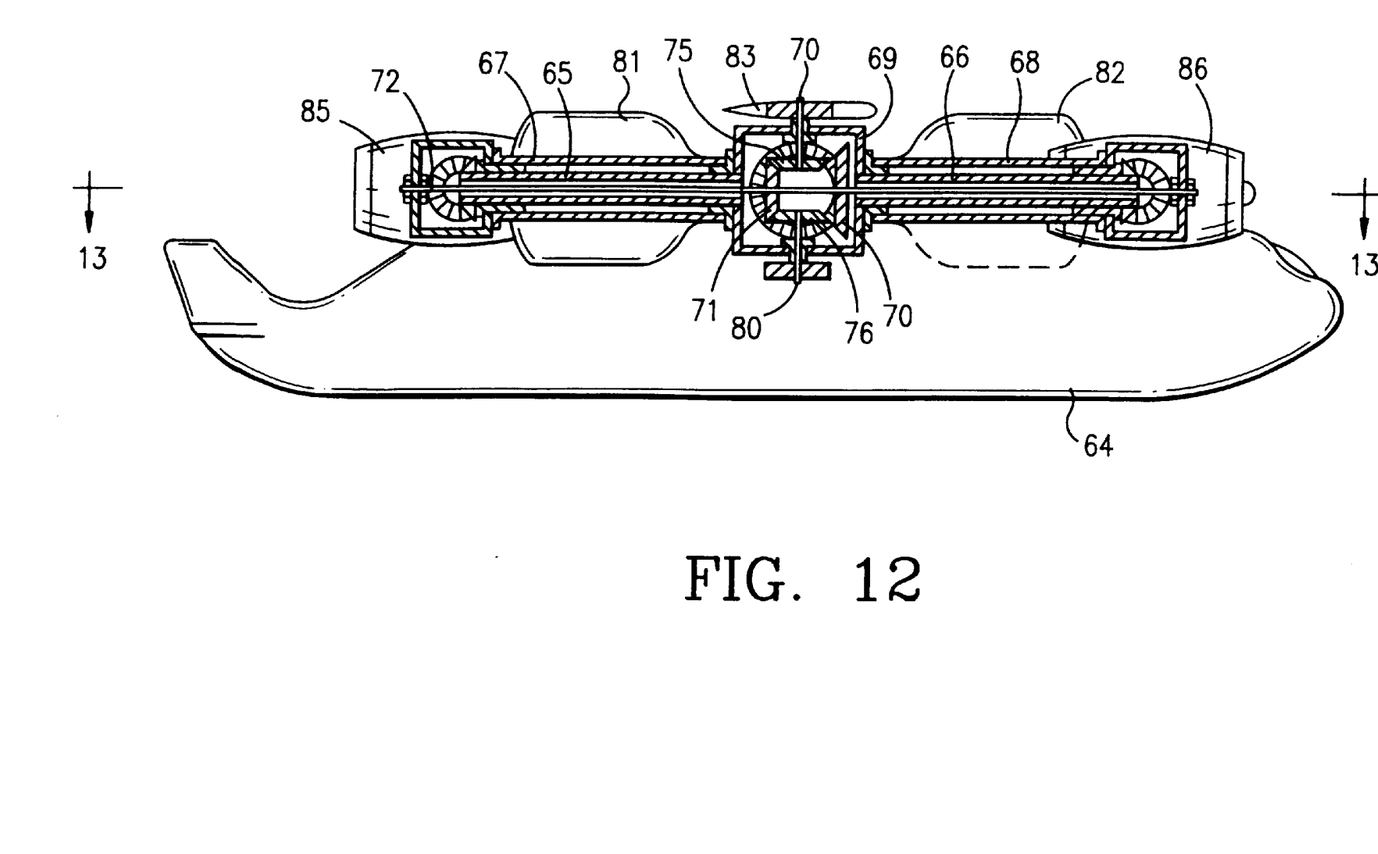
FIG. 12 is a schematic cross-sectional side elevation view of a vertical takeoff and landing aircraft with a propulsion system of the preferred embodiment on the lines 12—12 of FIG. 13.
Figure 13:
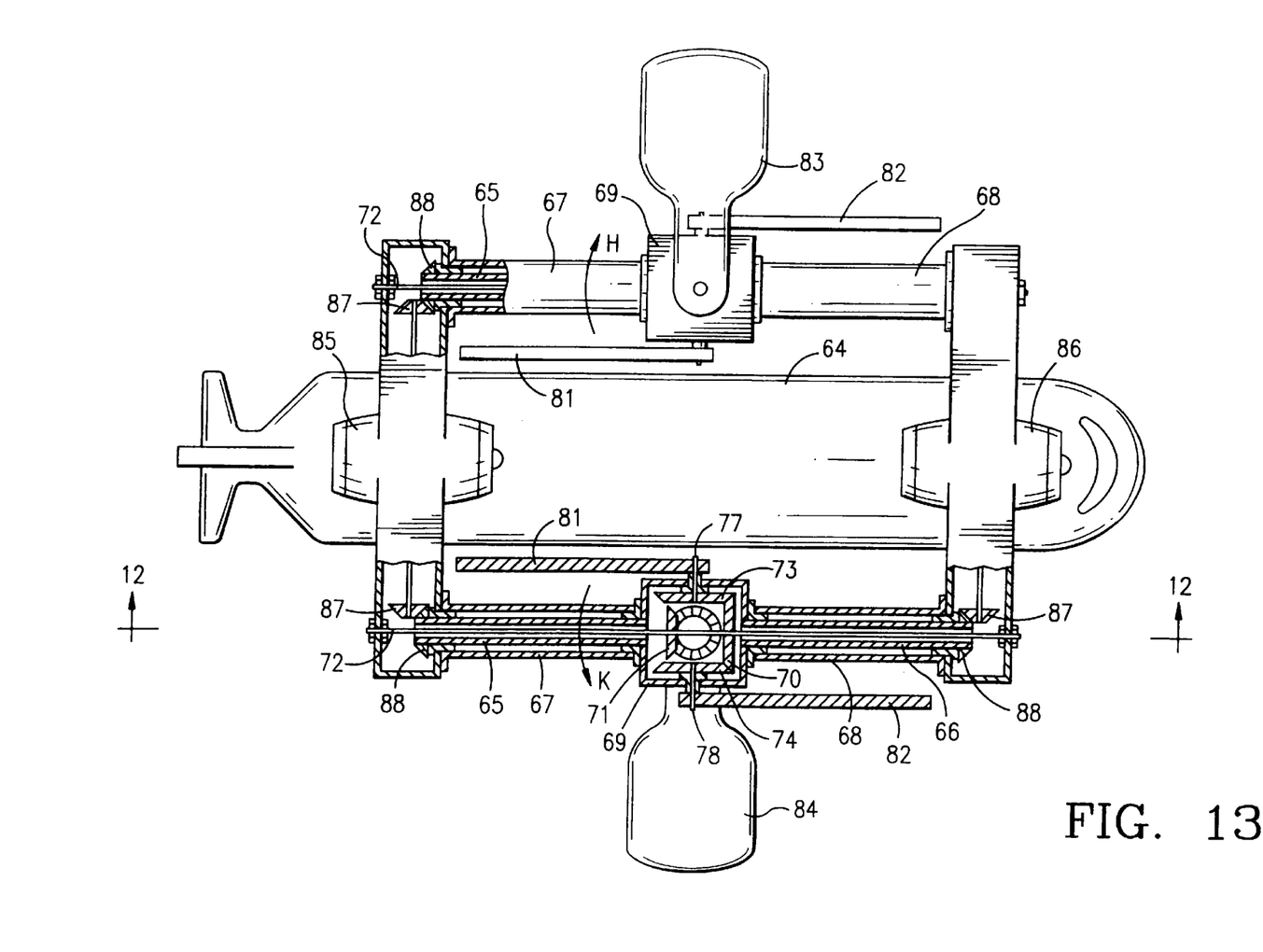
FIG. 13 is a schematic fragmentary cross-sectional top plan view on the lines 13—13 of FIG. 12.

Referring now to FIGS. 12 and 13, a vertical takeoff and landing aircraft is schematically shown. A propulsion system includes two hollow driving shafts mounted on both sides of the fuselage 64 of the aircraft parallel to its longitudinal axis. Each of the driving shafts consists of two parts 67 and 68 which are mounted in the housings 65, 66 with planetary gear-boxes 69 between them. Two sun angle bevel gears 70, 71 are mounted on an axial support means 72 in each of the gear-boxes 69 and the planet bevel mitre gears 73, 74, 75, 76 are mounted on the radial shafts 77, 78, 79, 80, respectively. The blades 81, 82, 83 and 84 are mounted on the ends of these radial shafts with variable angles of incidence so that when the blades 81 and 82 are oriented along the longitudinal axis of the aircraft, the blades 83 and 84 extend sidewards in horizontal directions from the aircraft.

In operation, the hollow driving shafts are rotated together with planetary gear-boxes 69 synchronously in opposite directions, indicated by arrows H and K, by the engines 85 and 86 through the gear engagements 87, 88. The blades on each side of the fuselage 64 are working as "flapping wings". As a result, a vertical propulsive force is exerted for lifting or sustaining the aircraft. The blades have airfoil cross-sections so that when the aircraft is moving ahead by any other type of propeller or jet engine (not shown), the blades in horizontal positions can be used as regular wings.

While this invention has been described with reference to the structures disclosed herein, they are merely chosen and described to illustrate the principle, applications, and practical use of the invention to thereby better enable others skilled in the art to utilize this invention. The preferred embodiments of the present invention illustrated in FIGS. 1–13 are not confined to the details as set forth and are not intended to be exhaustive or to limit the invention to the precise form disclosed. For example, the driving shafts can be rotatably mounted on the support means (17, 72), which can be simultaneously used for fixing the sun gears of the planetary engagements. The invention is intended to cover any modifications, which may be variously practiced within the scope of the following claims or their legal equivalents, rather than by examples given.

What is claimed is:

1. A method of developing a propulsive force in a liquid or a gaseous fluid, including:

disposing at least one primary axis of rotation;

disposing at least one pair of generally parallel fluid moving means with variable angles of incidence in planes of rotation around said primary axis of rotation;

disposing at least one secondary axis of rotation perpendicular to said primary axis of rotation and intercrossed with said primary axis of rotation at a substantially mid point between said fluid moving means;

rotating said pair of fluid moving means around said primary axis of rotation in opposite directions with the same speed;

and rotating said pair of fluid moving means together with said primary axis of rotation around said secondary axis of rotation with the same speed.

2. The method of developing a propulsive force of claim 1, further including:

changing said variable angles of incidence during said rotations so that said fluid moving means work simultaneously as a screw propeller and in a paddling manner.

3. The method of developing a propulsive force, of claim 1, further including:

disposing two said primary axes of rotation generally perpendicular to each other;

disposing at least two said pairs of generally parallel fluid moving means, wherein at least one of said pairs of fluid means being disposed with angles of incidence in the planes of rotation around each of said two primary axes of rotation;

disposing said at least one secondary axis of rotation perpendicular to said two primary axes of rotation and intercrossed with said primary axes of rotation at a substantially mid point between said fluid moving means;

rotating said pair of fluid moving means around each said primary axis of rotation in opposite directions with the same speed;

and rotating said pairs of fluid moving means together with said primary axes of rotation around said secondary axis of rotation with the same speed.

4. The method of developing a propulsion force of claim 3, further including:

disposing said two pairs of fluid moving means so that when one pair of said fluid moving means extend in opposite directions generally parallel to said secondary axis, the other pair of said fluid moving means extend in the same direction generally parallel to an axis perpendicular to said secondary axis of rotation.

5. The method of developing a propulsive force, of claim 3, further including:

disposing at least two said secondary axis of rotation generally parallel to each other, each of said secondary axes of rotation being perpendicular to said primary axes of rotation and intercrossed with said primary axes of rotation at a substantially mid point between said fluid moving means;

and rotating said pairs of fluid moving means together with said primary axes of rotation around said two secondary axes of rotation in opposite directions with the same speed.

6. The method of developing a propulsive force of claim 1, further including:

disposing at least two said secondary axes of rotation generally parallel to each other, each of said secondary axes of rotation being generally perpendicular to said primary axis of rotation and intercrossed with said primary axis of rotation at a substantially mid point between said fluid moving means;

and rotating said pairs of fluid moving means together with said primary axes of rotation around said secondary axes of rotation in opposite directions with the same speed.

7. A propulsion apparatus, including:

at least one driving shaft;

at least one gear-box mounted on said driving shaft, said gear-box including at least one sun bevel mitre gear mounted on a support means coaxially with said driving shaft and planet bevel mitre gears mounted on radial shafts, said radial shafts being generally perpendicular to said driving shaft and to each other;

fluid moving means mounted on said radial shafts with variable angles of incidence in planes of rotation around the axes of said radial shafts;

and means for rotating said driving shaft, wherein:

said fluid moving means being oriented so that when two of said fluid moving means extend in opposite directions generally parallel to the axis of said driving shaft, the other two of said fluid moving means extend in the same direction generally parallel to an axis perpendicular to the axis of said driving shaft.

8. The propulsion apparatus of claim 7, further including a means for changing said variable angles of incidence so that said fluid moving means work simultaneously as a screw propeller and in a paddling manner.

9. The propulsion apparatus of claim 8, wherein said means for changing said angles of incidence include a cam system for swinging said fluid moving means around axes perpendicular to the axes of said radial shafts.

10. The propulsion apparatus of claim 7, wherein said driving shaft is hollow and said support means for said sun bevel mitre gears is positioned along the axis of said hollow driving shaft.

11. The propulsion apparatus of claim 7, wherein four said planet bevel mitre gears are mounted on four said radial shafts and are engaged with each other, said sun bevel mitre gear being engaged with at least one additional said planet bevel mitre gear mounted on at least one of said radial shafts.

12. The propulsion apparatus of claim 7, wherein two sun bevel mitre gears are mounted coaxially with said driving shaft and engaged with said planet bevel mitre gears mounted on said radial shafts.

13. The propulsion apparatus of claim 7, wherein said fluid moving means have airfoil sections.

14. The propulsion apparatus of claim 7, further including:

at least one more similar propulsion apparatus, wherein said driving shaft in one of said propulsion apparatus is generally parallel to said driving shaft in another said propulsion apparatus;

and means for rotating said driving shafts of said propulsion apparatus in opposite directions.

15. The propulsion apparatus of claim 14, further including means for synchronization of rotation of said driving shafts in opposite directions.

16. A marine vessel including said propulsion system of claim 7.

17. An aircraft including said propulsion system of claim 7.

18. A propulsion apparatus, including:

at least one hollow driving shaft;

at least one gear-box mounted on said driving shaft, said gear-box including at least one sun bevel mitre gear positioned coaxially with said driving shaft and planet bevel mitre gears mounted on four radial shafts, said radial shafts being generally perpendicular to said driving shaft and to each other;

a fluid moving means mounted on each of said four radial shafts generally in planes of rotation around the axes of said radial shafts, said fluid moving means being oriented so that when two of said fluid moving means extend generally parallel to the axis of said driving shaft in opposite directions, the other two of said fluid moving means extend in the same direction generally parallel to an axis perpendicular to said driving shaft;

and means for rotating said driving shaft.

19. The propulsion apparatus of claim 18, wherein four said planet bevel mitre gears are mounted on said four radial shafts and are engaged with each other, said sun bevel mitre gear being engaged with at least one additional said planet bevel mitre gear mounted on at least one of said radial shafts.

20. The propulsion apparatus of claim 18, wherein two sun bevel mitre gears are mounted coaxially with said driving shaft and engaged with said planet bevel mitre gears mounted on said radial shafts.

21. The propulsion apparatus of claim 18, wherein said fluid moving means have airfoil sections.

22. The propulsion apparatus of claim 18, further including:
   at least one more similar propulsion apparatus, wherein said driving shaft in one of said propulsion apparatus is generally parallel to said driving shaft in another said propulsion apparatus;
   and means for rotating said driving shafts of said propulsion apparatus in opposite directions.

23. The propulsion apparatus of claim 18, further including means for synchronization of rotation of said driving shafts in opposite directions.

24. A marine vessel including said propulsion system of claim 18.

25. An aircraft including said propulsion system of claim 18.

* * * * *